United States Patent [19]

Enix

[11] 4,209,073
[45] Jun. 24, 1980

[54] COLLAPSIBLE FOUR WHEEL ELECTRIC POWERED VEHICLE

[76] Inventor: Clarence Enix, 1500 Brandon Rd., Joliet, Ill. 60436

[21] Appl. No.: 882,507

[22] Filed: Mar. 1, 1978

[51] Int. Cl.² .......................... B60K 1/00; B62M 1/14
[52] U.S. Cl. .................................. 180/65 R; 180/11; 280/242 WC
[58] Field of Search .................. 180/DIG. 3, 11, 65 R, 180/65 E, 78; 297/DIG. 4; 280/642, 242 WC, 42, 657, 658, 647, 209, 267, 269, 287, 240, 93, 95 R, 282; 338/50, 232, 260, 277, 295, 321, 333, 334; 318/139; 248/16

[56] References Cited

U.S. PATENT DOCUMENTS

| | | | |
|---|---|---|---|
| 653,169 | 7/1900 | Coleman | 180/78 |
| 834,424 | 10/1906 | Waters | 338/295 |
| 1,429,213 | 9/1922 | Gladish | 180/65 R |
| 2,742,973 | 4/1956 | Johannesen | 180/65 R X |
| 2,910,879 | 11/1959 | Hanks | 248/16 X |
| 2,914,111 | 11/1959 | Mize | 297/DIG. 4 |
| 3,103,384 | 9/1963 | Ziui | 280/30 |
| 3,204,791 | 9/1965 | Williams | 180/65 R |
| 3,213,957 | 10/1965 | Wrigley | 280/639 |
| 3,322,224 | 5/1967 | Muller | 280/209 |
| 3,331,614 | 7/1967 | McClintock | 280/42 |
| 3,533,484 | 10/1970 | Wood | 180/65 R |
| 3,635,301 | 1/1972 | Tuson | 280/639 |
| 3,749,192 | 7/1973 | Karchak | 180/DIG. 3 |
| 3,770,073 | 11/1973 | Meyer | 180/70 |
| 3,896,891 | 7/1975 | Miltenburg | 180/DIG. 3 |
| 3,897,857 | 8/1975 | Rodaway | 297/DIG. 4 |
| 3,955,639 | 5/1976 | Cragg | 180/6.5 |
| 4,026,568 | 5/1977 | Hallam | 280/247 |

FOREIGN PATENT DOCUMENTS 845906   8/1960   United Kingdom ...................... 280/42

*Primary Examiner*—John J. Love
*Assistant Examiner*—Randall A. Schrecengost
*Attorney, Agent, or Firm*—Ernest S. Kettelson

[57] ABSTRACT

A collapsible four wheel vehicle powered by an electrical source, including a storage battery, an electric motor, rear wheels driven by the electric motor, a pair of front wheels having a diameter nearly as great as the diameter of the rear wheels, a resistance bank connected between said battery and said electric motor, a switch means to control the operation of said electric motor, a steering mechanism to steer the front wheels, passenger seat, and a chassis frame on which all of said component parts are mounted and which frame is collapsible in the sense that it may be disassembled easily and quickly into two main sections each of which are foldable into a flat compact unit.

12 Claims, 10 Drawing Figures

COLLAPSIBLE FOUR WHEEL ELECTRIC POWERED VEHICLE

BACKGROUND OF THE INVENTION

This invention relates to the field of electric powered land vehicles of relatively small size for personal use both indoors and outdoors, and for carrying on a boat, motor home or the like, as an auxiliary vehicle after docking at a pier or parking at a camp site.

Previous land vehicles of this type have included two wheeled motor bikes and so-called "mopeds", powered by internal combustion motors. Two wheel vehicles have the disadvantage of being less stable than a four wheeled vehicle, making it difficult to use for going to a store from dockside or a campsite and returning with several sacks of groceries and provisions. Internal combustion motors also require highly flammable fuel which adds to the danger of fire and explosion when carried as an auxiliary vehicle aboard a boat or a motor home.

Personal size electric powered wheel chairs are also known. However, they are essentially nothing more than a wheel chair of the hospital type for use by patients or invalids to which an electric motor has been connected. They are intended for use primarily indoors, or only on paved surfaces such as sidewalks when used outdoors. They are not intended for overland travel, nor for travel on a roadway, nor are they suitable for such purpose. Among other things, the front wheels of such wheel chair type conveyances are much smaller in diameter than the rear wheels. Also, when electric motors are mounted on a hospital type or invalid type of wheel chair, the use of a direct drive mechanism such as a chain or belt drive has to be avoided or complicated uncoupling mechanism is required, so the electric motor may be disengaged from the wheels to enable turning by hand when desired or necessary. Moving the wheel chair up or down over curbs is an example of when turning the wheels by hand may be necessary.

SUMMARY OF THE INVENTION

It is an object of the invention to provide a collapsible four wheel electric powered vehicle for indoor and outdoor use.

It is an object of the invention to provide a collapsible four wheel electric powered vehicle for overland and roadway use as an auxiliary vehicle.

It is an object of the invention to provide a collapsible four wheel electric powered vehicle for auxiliary use which is both stable and safe.

It is an object of the invention to provide a collapsible four wheel electric powered vehicle for auxiliary use which is more stable than presently known auxiliary use vehicles, capable of carrying more cargo and doing so more safely, and which presents less of a fire and explosion hazard.

It is an object of the invention to provide a collapsible four wheel electric powered vehicle for auxiliary use in which the chassis, frame, and parts mounted thereon may be easily and quickly disassembled and re-assembled, and when disassembled may be folded into compact units for storage and carrying.

It is an object of the invention to provide a collapsible four wheel electric powered vehicle in which the front wheels are substantially the same diameter as the rear wheels.

It is an object of the invention to provide a collapsible four wheel electric powered vehicle in which the chassis frame may be quickly disassembled into two halves, including cross frame members pivotally mounted to respective halves of the chassis frame for folding thereagainst when disassembled.

DESCRIPTION OF PREFERRED EMBODIMENT

Figure 1:
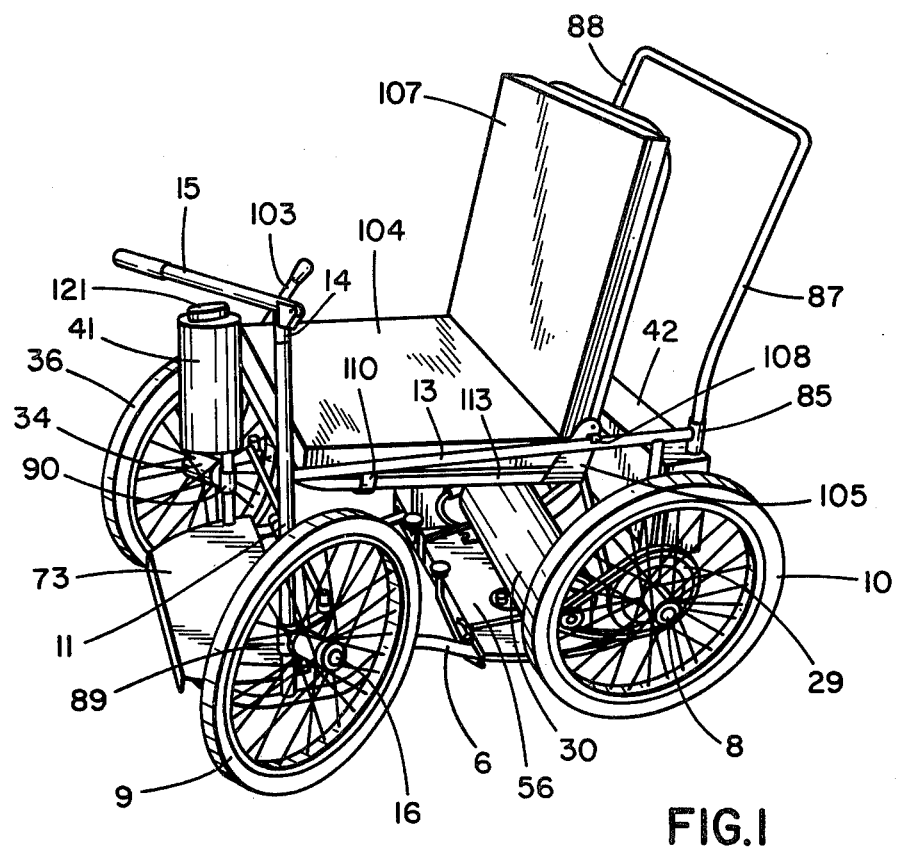
FIG. 1 is a perspective view of one side of an electric powered vehicle in accordance with this invention.
Figure 2:
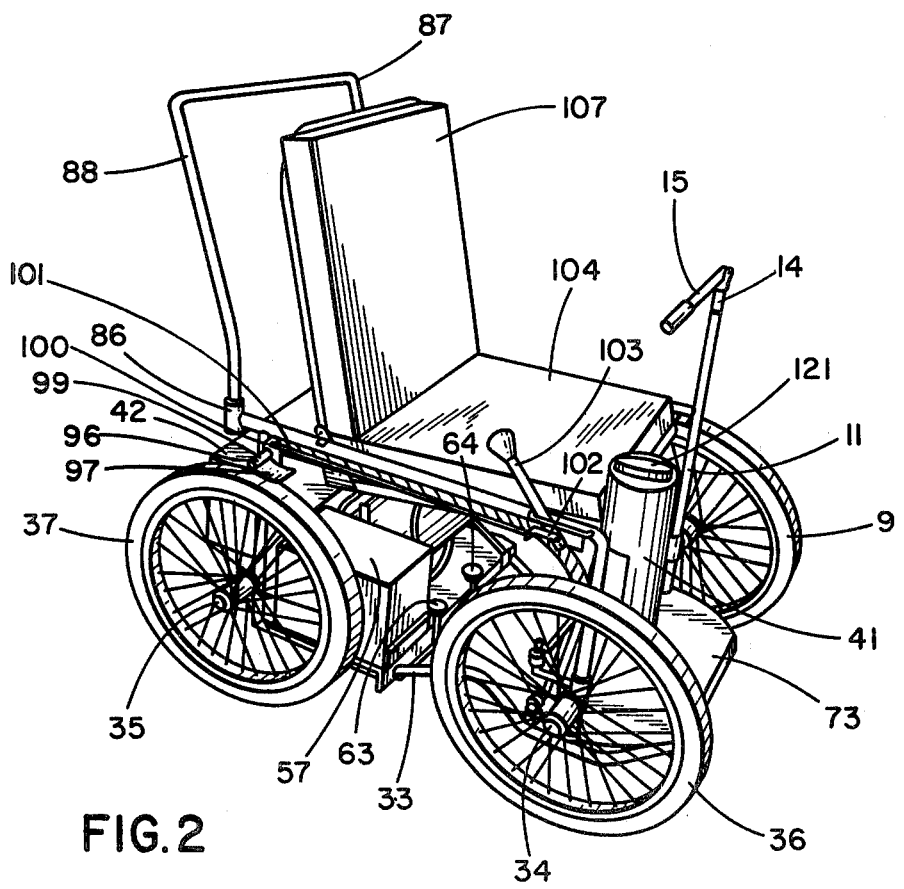
FIG. 2 is a perspective view of the opposite side of the electric powered vehicle shown in FIG. 1.
Figure 3:
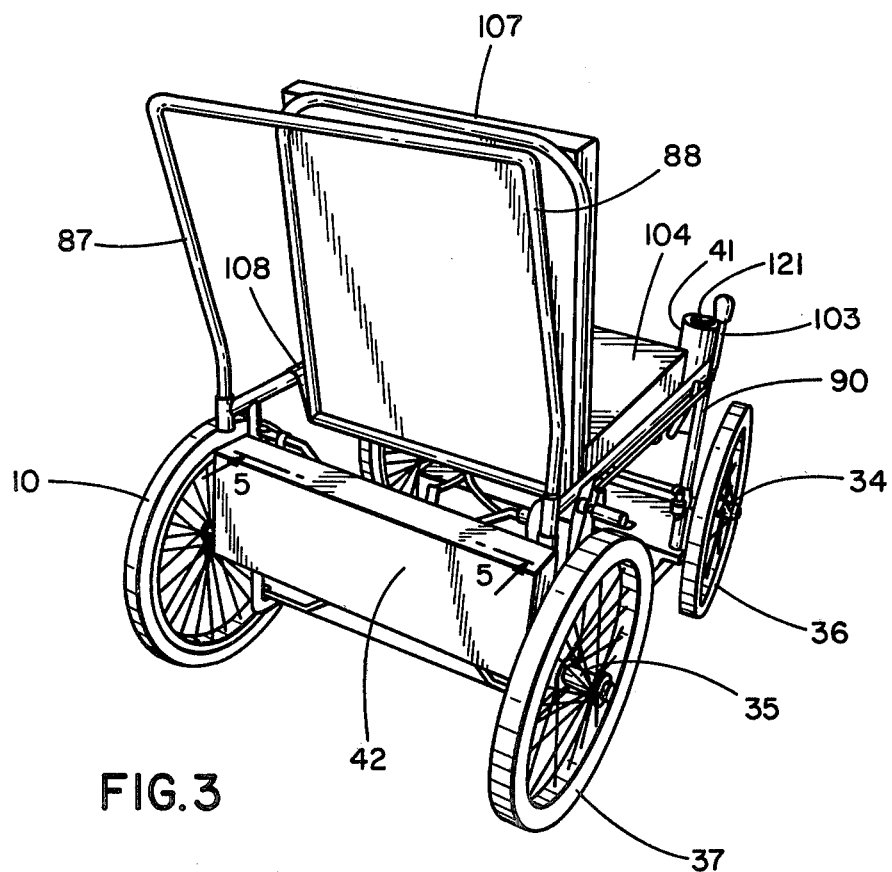
FIG. 3 is a perspective view from the rear of the electric powered vehicle shown in FIG. 1.
Figure 5:
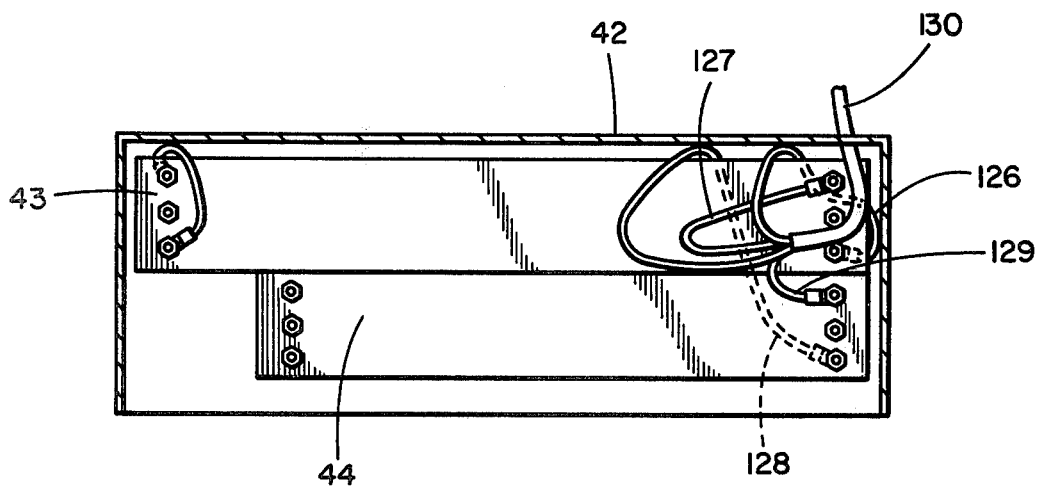
FIG. 5 is a front elevation view of the resistance bank assembly used in the electric powered vehicle in accordance with this invention.
Figure 4:
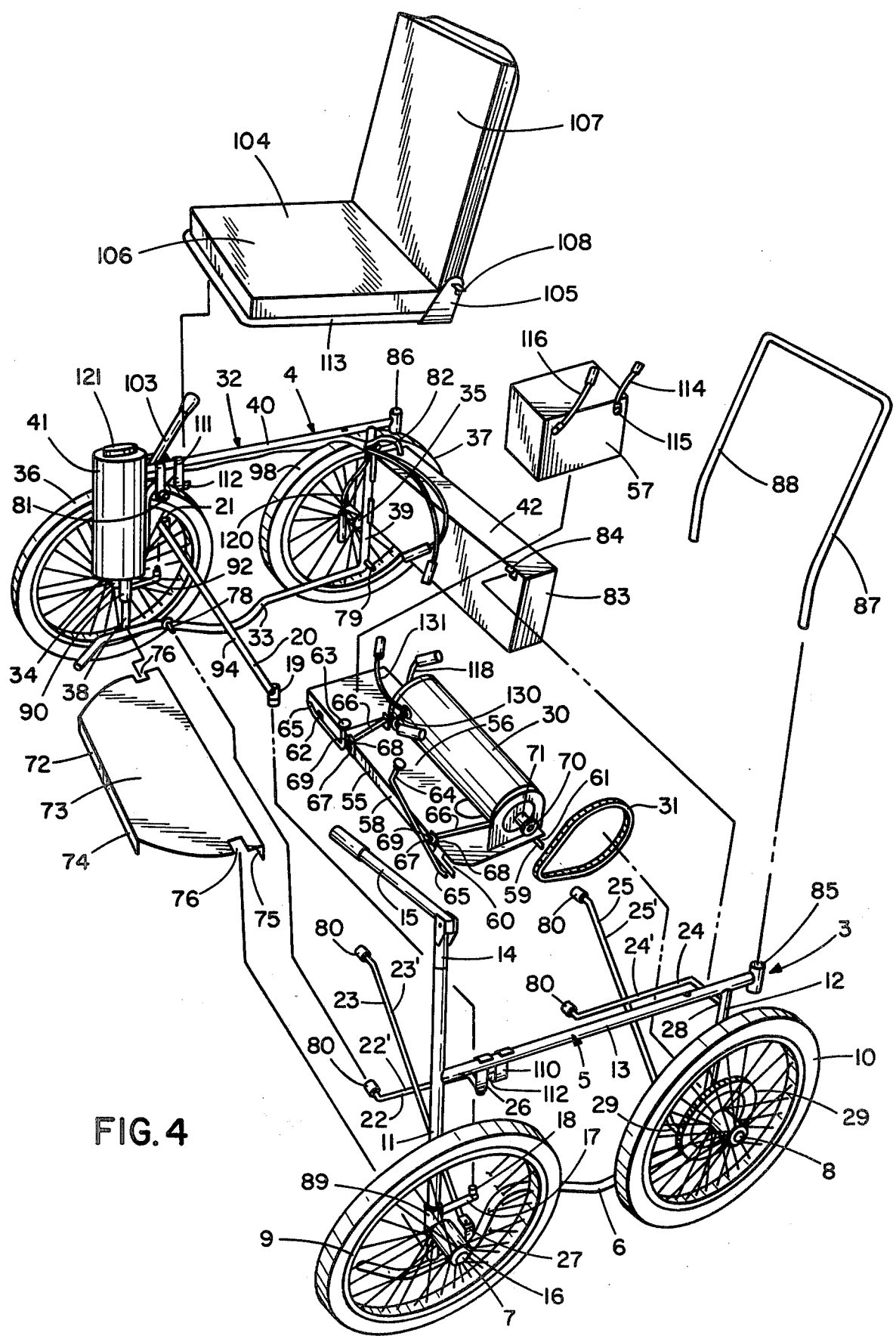
FIG. 4 is an exploded view of the electric powered vehicle shown in FIG. 1.
Figure 6:
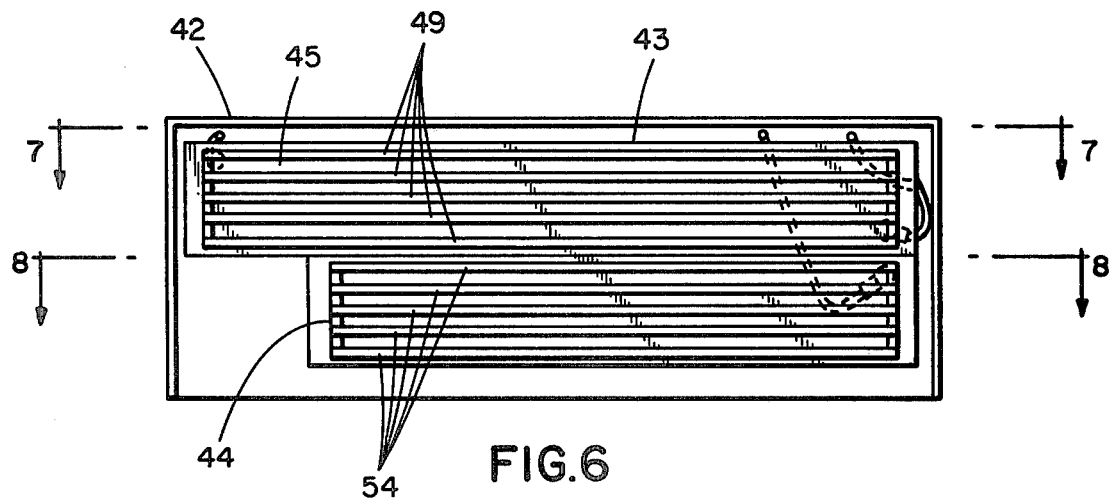
FIG. 6 is a front elevation view of the resistance bank assembly shown in FIG. 5 with the front cover plate removed.
Figure 7:
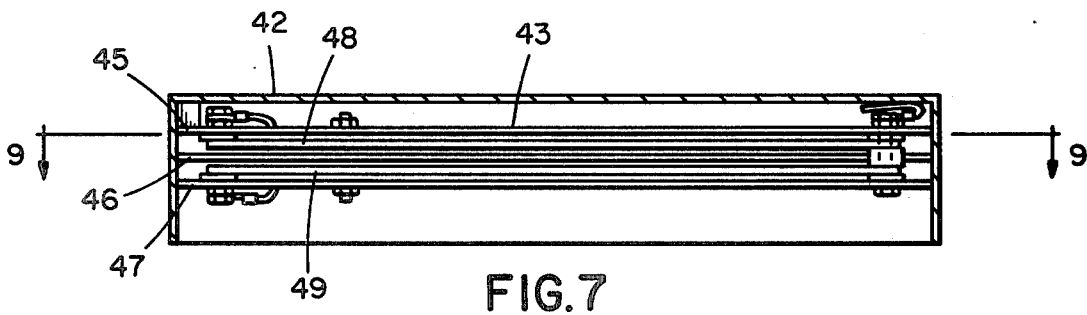
FIG. 7 is a top plan view of the resistance bank assembly taken on line 7—7 of FIG. 6.
Figure 8:
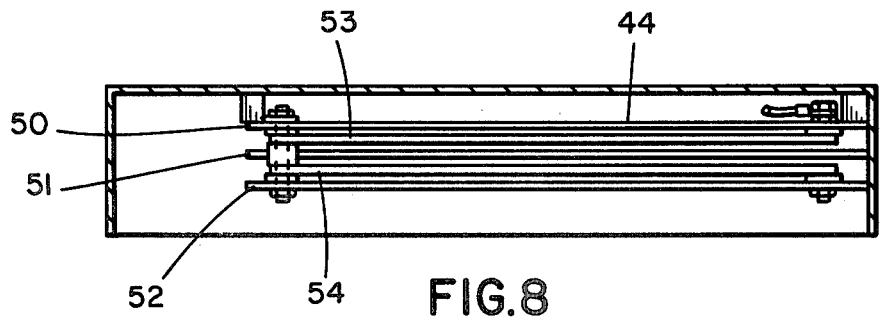
FIG. 8 is a top plan view of the lower half portion of the resistance bank assembly taken on line 8—8 of FIG. 6.
Figure 9:
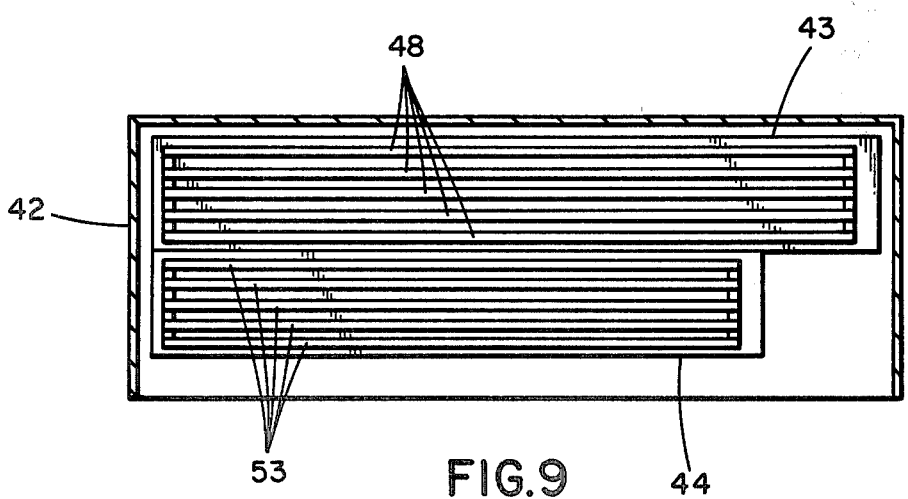
FIG. 9 is a rear elevation view of the resistance bank assembly as seen when taken on line 9—9 of FIG. 7.

A collapsible four wheel electric powered vehicle in accordance with this invention is designated generally by the reference number 1.

A collapsible chassis frame assembly 2 includes a first frame assembly half 3 which may be quickly disconnected from a second frame assembly half 4.

Frame assembly half 3 includes a side frame 5 comprising a lower longitudinal frame member 6 extending between front axle 7 and rear axle 8 on which the front wheel 9 and rear wheel 10 of first frame assembly half 3 are respectively mounted; an upright frame member 11 extending upwardly from a front portion of frame member 6 at substantially a right angle; an upright frame member 12 extending upwardly from a rear portion of frame member 6 at substantially a right angle; and an upper longitudinal frame member 13 extending between upright frame member 11 and 12.

Upright frame member 11 is tubular and includes a steering shaft 14 rotatably mounted therein, and a steering handle 15 pivotally mounted at the upper end of steering shaft 14. Front axle 7 is mounted to pivot about upright frame member 11 to enable steering of front wheel 9 whose hub 16 is mounted on front axle 7.

A steering arm 17 is also mounted for pivotal movement about upright tubular frame member 11 upon rotation of steering shaft 14 which is connected at the lower end to steering arm 17. An upwardly projecting lug 18 extends from the free end of steering arm 17 for connection thereto of compression connector 19 at one end of tie rod 20. Tie rod 20 includes a second compression connector 21 at its opposite end for connection to a corresponding lug on the steering arm which steers the opposite front wheel.

Frame assembly half 3 also includes two pairs of cross-members, including cross-members 22 and 23 in the front pair and cross-members 24 and 25 in the rear pair. Cross-member 22 is pivotally secured to pivot assembly 26 affixed to a front portion of upper longitudinal frame member 13. Cross-member 23 is pivotally secured to pivot assembly 27 affixed to a front portion of lower longitudinal frame member 6. Cross-member 24 is pivotally secured to pivot assembly 28 affixed to a rear portion of upper longitudinal frame member 13. Cross-arm member 25 is pivotally secured to pivot assembly 29 affixed to a rear portion of lower longitudinal frame member 6.

Each cross-member 22–25 includes an elongated diagonally extending portion 22'–25' respectively, whereby the cross-members 22 and 24 secured at one end to pivot assemblies affixed to the upper longitudinal frame member 13 are positioned for connection of their opposite ends to the corresponding lower longitudinal frame member of frame assembly half 4. Similarly, cross-members 23 and 25 secured at one end to pivot assemblies affixed to the lower longitudinal frame member 6 are positioned for connection of their opposite ends to the corresponding upper longitudinal frame member of frame assembly half 4.

Rear wheel 10 of frame assembly half 3 includes a sprocket 29 for connection to the electric motor 30 by means of a drive chain 31 when the vehicle has been assembled.

Frame assembly half 4 includes a side frame 32 comprising a lower longitudinal frame member 33 extending between front axle 34 and rear axle 35 on which the front wheel 36 and rear wheel 37 of the second frame assembly half 4 are respectively mounted; an upright frame member 38 extending upwardly from a front portion of frame member 33 at substantially a right angle; an upright frame member 39 extending upwardly from a rear portion of frame member 33 at substantially a right angle; and an upper longitudinal frame member 40 extending between upright frame members 38 and 39.

A rotary tap switch 41 is mounted on upright frame member 38. A resistance bank assembly 42 is pivotally mounted on upright frame member 39.

Resistance bank assembly 42 includes two resistance bank members 43 and 44. Resistance bank member 43 includes three spaced apart fiberglass electrically insulating panels 45, 46, and 47, having five resistance elements 48 sandwiched between fiberglass panels 45 and 46 and five resistance elements 49 sandwiched between panels 46 and 47.

Resistance bank member 44 similarly includes three spaced apart electrically insulating fiberglass panels 50, 51 and 52, having five resistance elements 53 sandwiched between fiberglass panels 50 and 51 and five resistance elements 54 sandwiched between fiberglass panels 51 and 52.

The resistance elements 48, 48, 53 and 54 may consist of welding rods. The resistance elements 48 and 49 in the embodiment of the invention described herein are twenty three inches long. The resistance elements 53 and 54 are nineteen inches long.

The resistance bank member 43 and resistance elements 48 and 49 mounted thereon are inserted into the electrical circuit to drive the electric motor 30 in one direction, such as reverse. The resistance bank member 44 and resistance elements 53 and 54 mounted thereon are inserted into the electrical circuit to drive the electric motor 30 in the opposite direction, such as forward.

A rear base member 55 is detachably mounted between lower longitudinal frame members 6 and 33. The base member 55 includes a flat mounting surface 56 on which the electric motor 30 and battery 57 are mounted, and depending flanges 58 and 59 which extend downwardly from each opposite longitudinal edge of base member 55.

Each flange 58 and 59 include longitudinally extending slots 60 and 61 which open at the edge of base member 55 facing lower longitudinal frame member 6, to receive frame member 6 therein when attaching base member 55 during assembly of the vehicle. Each flange 58 and 59 also include vertically extending slots 62 which open at the bottom free edge of flanges 58 and 59 to receive the facing portions of lower longitudinal frame member 33 of frame assembly half 4 therein to complete the seating of base member 55 on the frame assembly. A pair of locking levers 63 and 64 are pivotally mounted on flange 58, having free end portions 65 which extend across the openings of the slots 60 and 62 when pivoted to the locking position thereby retaining lower frame member 33 in slot 62 until the locking levers are pivoted to the unlocking position.

Adjusting rods 66 are attached at one end to the electric motor 30 and at the other end 67 they project through apertures in projecting tabs 68 extending upwardly from flange 58. The ends 67 of adjusting rods 66 are threaded, and nuts 69 are provided for threading thereon to hold adjusting rods 66 in place against projecting tabs 68 at the desired location of motor 30. When the nuts 69 are removed, or moved nearer to the free ends 67 of rods 66, the motor 30 may be moved rearwardly toward rear wheel 10 and sprocket 29. In such position, the drive chain 31 may be attached to the drive gear 70 attached to the drive shaft 71 of electric motor 30 and to the sprocket 29. When the chain 31 is placed on sprocket 29 and drive gear 70, the motor 30 may be moved forwardly with adjusting rods 66 extending farther through the apertures in projecting tabs 68 until the drive chain 31 is tightened. The nuts 69 may then be tightened against projecting tabs 68 to hold the adjusting rods 66 and the motor 30 in the desired position relative to the sprocket 29 of rear wheel 10.

The battery 57 is mounted on the base member 55 adjacent to the electric motor 30.

A front base member 72 is detachably mounted at the front of the vehicle frame assembly between upright frame member 11 of frame assembly half 3 and upright frame member 38 of frame assembly half 4. Front base member 72 includes a flat surface portion opposite longitudinal edges of front base member 72. Slots 76 are provided in the flat surface portion 73 opening to opposite side edges thereof to receive upright frame member 11 of frame assembly half 3 in one of said slots at one side of front base member 72 and to receive upright frame member 38 of frame assembly half 4 in the other of said slots at the opposite side of front base member 72. Vertical slots 77 are provided in depending flange 75, at spaced apart locations to receive respective facing portions of lower longitudinal members 6 (of frame assembly half 3) and 33 (of frame assembly half 4) therein, when front base member 72 is attached during assembly of vehicle frame assembly of this invention.

The rear base member 55 and the front base member 72 thus hold the bottom portions of the frame assembly halves 3 and 4 securely in place when assembled as described. The front base member 72 serves as a foot rest for the driver and passenger of the vehicle.

The lower longitudinal member 33 of frame assembly half 4 includes a pair of connecting lugs 78 and 79, at spaced apart ends of cross-members 22 and 24 pivotally mounted to frame assembly half 3 as described above. The free end portions of cross-members 22 and 24 include coupling members 80 of conventional design, having recesses therein to receive respective connection lugs 78 and 79 to hold said lugs therein until released.

The upper longitudinal frame member 40 of frame assembly half 4 also includes a similar pair of connecting lugs 81 and 82 mounted therein at spaced apart locations and positioned for registration with the corresponding ends of cross-members 23 and 25 pivotally mounted to frame assembly half 3 as described above. The free end portions of cross-members 23 and 25 also include coupling members 80 of conventional design, having recesses therein to receive respective connecting lugs 81 and 82 and to hold said lugs therein until released.

The cross-members 22–25 pivotally secured to frame assembly half 3, when connected to connecting lugs 78 and 79 and 81 and 82 respectively, hold both the upper and lower portions of the frame assembly halves 3 and 4 securely in place.

The resistance bank assembly 42 includes a housing 83 which extends between upright frame member 39 of frame assembly half 4 (on which it is pivotally mounted) and upright frame member 12 of frame assembly half 3 when the vehicle frame assembly is completely assembled. A hook 84 is provided along the upper edge of housing 83 near the end thereof adjacent upright frame member 12 when in assembled position, for hooking over the facing portion of cross-member 24. The resistance bank assembly is thus held securely in place when assembly is completed.

The upper longitudinal frame members 13 (of frame assembly half 3) and 40 (of frame assembly half 4) include sockets 85 and 86 respectively secured at their rearward ends. A re-inforcing U-shaped bar member having legs 87 and 88 is provided, the ends of legs 87 and 88 being detachably receivable in sockets 85 and 86 respectively.

The front axles 7 (of frame assembly half 3) and 34 (of frame assembly half 4) are rotably mounted on upright frame members 11 (of frame assembly half 3) and 38 (of frame assembly half 4) by means of sleeve portions 89 and 90, sleeve portion 89 being connected to the lower end of steering shaft 14 through a horizontally elongated aperture (not shown) in tubular member 11 which permits rotation of sleeve 89 relative to tubular member 11. Steering lever arms 17 and 92 extend laterally from sleeves 89 and 90, each having upwardly projecting connecting lugs 18 and 93 respectively. A tie rod 20 having tubular connectors 19 and 21 at opposite ends is connected between the steering lever arms 19 and 92, by connecting lugs 18 and 93 in tubular connectors 19 and 21 respectively. Thus, when steering handle 15 is moved causing sleeve portion 89 of front axle 7 to rotate relative to upright member 11, such motion is transmitted through tie rod 20 to sleeve portion 90 of front axle 34 of the frame assembly half 4 causing it to move with front axle 7 of frame assembly half 3. Thus, when the vehicle is assembled, the front wheels 9 and 36 of both frame assembly halves may be steered by moving steering handle 15.

A brake mechanism 96 is provided for safety, including a brake shoe 97 pivotally mounted on the upper longitudinal frame member 40 of frame assembly half 4, and positioned for braking contact with the tire 98 of rear wheel 37 when pivoted to the braking position. The pivot assembly 99 on which brake shoe 97 is mounted includes a lever plate 100 having an aperture therein to receive one end of brake rod 101. The other end of brake rod 101 is pivotally secured to an end portion 102 of brake lever 103, which is pivotally mounted to a front portion of upper longitudinal frame member 40 and positioned for access by the driver of the vehicle. When the brake lever 103 is pulled rearwardly by the driver, the opposite end moves forwardly pulling the brake rod 101 forwardly. Such movement of brake rod 101 pivots the pivot assembly 99 and brake shoe 97 to the braking position, whereupon brake shoe 97 comes into frictional engagement with the tire 98 of rear wheel 37 thereby stopping the vehicle and holding it against movement. The brake shoe 97 is released from such frictional engagement when the brake lever 103 is moved forwardly to the release position.

A seat assembly 104 is provided, including a foldable frame 105 having seat 106 and a back rest 107 pivotally mounted thereto for folding forward over the seat 106 and for pivoting backward to the back rest position. The frame 105 includes projecting side hooks 108 and 109 which hook over upper longitudinal frame members 13 (of frame assembly half 3) and 40 (of frame assembly half 4) respectively to support the rear portion of seat frame 105 in place when assembled. Brackets 110 and 111 are also provided to support the front portion of seat frame 106, bracket 110 being secured to upper longitudinal frame member 13 (of frame assembly half 3) and bracket 111 being secured to upper longitudinal frame member 40 (of frame assembly half 4). Brackets 110 and 111 include a hook portion 112 to receive the tubular side rails 113 of the seat frame 105 when put in place on the completely assembled vehicle frame.

The electrical circuit of the vehicle in accordance with this invention is described as follows. A conductor cable 114 is connected to the negative terminal 115 of battery 57, and a second conductor cable 116 is connected to the positive terminal 117 of the battery 57.

The negative conductor cable 114 is connected to cable 118 connected to ground at the housing 119 of the motor 30.

The positive connector cable 116 is connected to the common conductor cable 120 which leads to the rotary tap switch or controller 41. The switch or controller 41 includes an operator 121, rotation of which by the driver to four positions 122, 123, 124, or 125 will cause the motor 30 to propel the vehicle forward or in reverse, and at two different speeds in each direction. In other words, the operator 121 may be rotated in one direction to a first position 122 which will propel the vehicle forward at a relatively slow speed and to a second position 123 by rotating further in the same direction which will cause the vehicle to move forward at a relatively faster speed. The operator 121 may be rotated in the opposite direction to first and second positions 124 and 125 to cause the vehicle to move in reverse at a relatively slower speed in such first position 124 at relatively faster speed in said second position 125.

Cables 126 and 127 lead from the switch or controller 41 to the resistance bank member 43.

Cables 128 and 129 lead from the switch or controller 41 to the resistance bank member 44.

Cables 126, 127, 128, and 129 are enclosed within the cable sheath 130 leading from the switch or controller 41 to the resistance bank assembly 42.

Cable 131 is connected to the armature circuit of motor 30 on the side thereof which will rotate motor 30 in the forward propelling direction, and is connected to switch or controller 41 at the terminals thereof which connect to resistance bank member 44.

Cable 132 is connected to the armature circuit of motor 30 on the side thereof which will rotate motor 30 in the reverse propelling direction, and is connected to switch or controller 41 at the terminals thereof which connect to resistance bank member 43.

Figure 10:
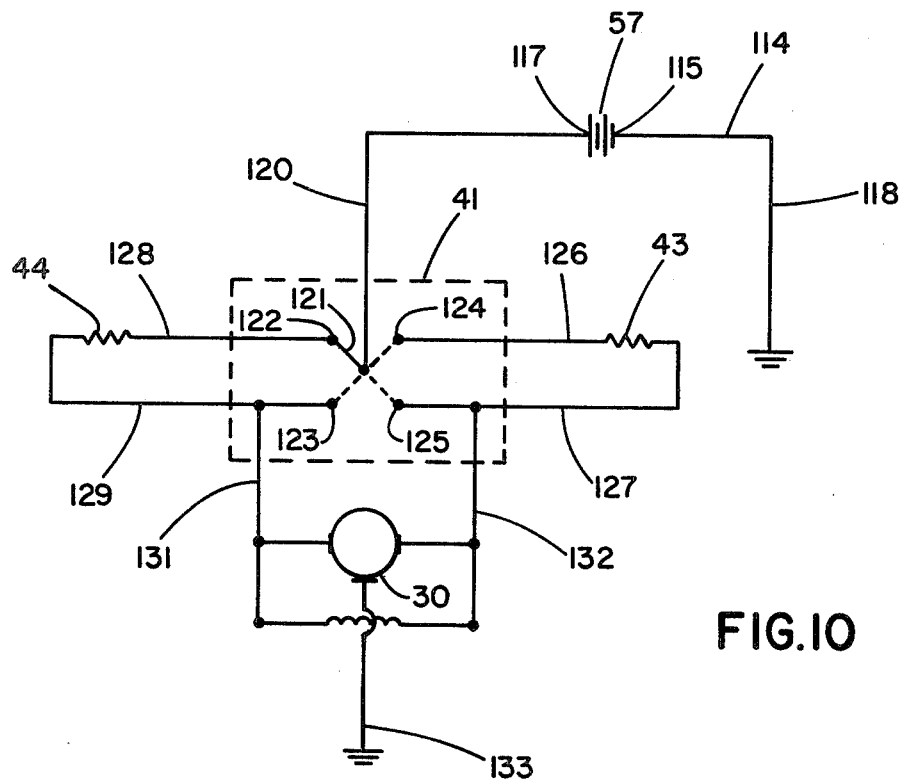
FIG. 10 is a schematic drawing of the electric circuitry of an electric powered vehicle in accordance with this invention.

As shown in the schematic in FIG. 10 of the drawing, when operator 121 is moved to position 122, current flow is through conductor resistance bank 44, conductor 129, and 131 to the armature circuit of motor 30 causing it to rotate in the forward propelling direction. The circuit is completed through the motor ground connection 133, and then through conductors 118 and 114 to the negative terminal 115 of battery 57. The swtich or controller 41 is connected to the positive terminal 117 of battery 57 through conductors 116 and 120.

When operator 121 is moved to position 123, the resistance bank 44 drops out of the circuit and current flow is directly through conductor 131 to the armature circuit of the motor 30 on the forward propulsion side. When in this position, the motor 30 will rotate faster than in position 122 when resistance bank 44 is in the armature circuit. Thus, when controller 41 is in position 122 the vehicle will move forward at a relatively slow speed, and when controller 41 is in position 123 the vehicle will move forward at a relatively faster speed.

When operator 121 is rotated in the opposite direction to position 124, a current path then leads from battery 56 through conductors 116 and 120, switch 41 to conductor 126, resistance bank member 43, conductors 127 and 132 to the armature circuit of motor 30 on the side which will cause it to rotate in the opposite or reverse direction. The circuit is completed through the motor ground connection 133, and then through conductors 118 and 114 to the negative terminal of battery 57. In this position 124, the vehicle will be propelled in reverse at a relatively slow speed.

When operator 121 is moved to position 125, the resistance bank 43 drops out of the circuit and current flow is directly through the conductor 132 to the armature circuit of motor 30 on the rearward propulsion side. When in this position, the motor 30 will rotate in the reverse direction faster than in position 124 when resistance bank 43 is in the armature circuit. Thus, when controller 41 is in position 124 the vehicle will move in reverse at a relatively slow speed, and when controller 41 is in position 125 the vehicle will move in reverse at a relatively faster speed.

The motor 30 used in this invention may be of the shunt wound D. C. type, having a field circuit 134 in parallel with the armature circuit 135.

The chassis frame assembly 2 and its sub-assemblies comprising frame assembly half 3 and frame assembly half 4 may be assembled and disassembled entirely by hand or manually without the use of tools. The wheels 9 and 10 are rotatably mounted on frame assembly half 3, and the wheels 36 and 37 are rotatably mounted on frame assembly half 4. The wheels are not removable from their respective frame assemblies without the use of appropriate tools. The wheels 9, 10, 36 and 37 are of sufficiently large diameter to enable the vehicle to move over relatively rough, unpaved surfaces such as yards, parks, and fields. The diameter may for example be on the order of eighteen inches or larger. Wheels having a diameter of less than about nine inches are not satisfactory for travel over rough unpaved terrain of a self propelled vehicle of the type described herein powered by an electric power source. Another feature of this invention is that the front wheels 9 and 10 are substantially the same diameter as the rear wheels 36 and 37.

I claim:

1. A vehicle powered by an electrical source, including a frame assembly which may be manually assembled and disassembled, a first frame sub-assembly, a second frame sub-assembly manually connectable to and manually disconnectible from said first frame sub-assembly, a plurality of wheels for said vehicle, at least one of said wheels being part of said first frame sub-assembly and at least one of said wheels being part of said second frame sub-assembly, lateral connecting members between said first and second sub-assemblies, said lateral connecting members including respective first ends and second ends, said first end of at least one of said lateral connecting members being pivotally and non-detachably connected to said first frame sub-assembly, including non-detachable connecting means to non-detachably connect said first end of said lateral connecting member to said first frame sub-assembly, said second end of said one lateral connecting member being rigidly and detachably connected to said second frame subassembly, latch means to connect and detachably lock said second end of said lateral connecting member to said second frame subassembly, each of said other lateral connecting members being pivotally and non-detachably connected at said first ends to one of said first and second frame sub-assemblies and rigidly and detachably connected to the other of said frame subassemblies, including non-detachable connecting means to non-detachably connect said first ends of said lateral other connecting members to one of said first and second frame subassemblies, whereby each of said first and second frame subassemblies are locked in fixed spaced apart relationship when so connected and prevented from movement toward or away from each other, said lateral connecting members being non-detachably and pivotally connected to one of said frame sub-assemblies when said frame sub-assemblies are disconnected from each other.

2. A vehicle as set forth in claim 1, wherein said first frame sub-assembly includes a front wheel and a rear wheel for one side of said vehicle, said second frame sub-assembly includes a front wheel and a rear wheel for the opposite side of said vehicle, said first end of said one of said lateral connecting members between said first and second sub-assemblies being pivotal on a vertical axis, including said vertical axis, said first frame sub-assembly lying in a first plane, said vertical axis being substantially parallel to said first plane.

3. A vehicle as set forth in claim 2, wherein said lateral connecting members include a plurality of lateral cross bars pivotally connected at said first end to said first frame sub-assembly, first connecting means at the said second end of said lateral cross bars, corresponding second connecting means on said second frame sub-assembly to receive and connect to said first connecting means, said first and second connecting means constituting said latch means to connect and detachably lock said second end of said lateral cross bars to said second frame sub-assembly, and said first and second connecting means being manually connectable and disconnectable.

4. A vehicle as set forth in claim 2, wherein said first and second frame sub-assemblies each includes a lower longitudinal frame member extending between the extended axes of said front wheel and said rear wheel, said lower longitudinal frame member including a front end portion in facing relationship with the side of said front wheel, said lower longitudinal member including an inturned portion spaced rearwardly of said axis of said front wheel a distance corresponding to the radius of said front wheel to permit free movement of said front wheel from planar alignment with said rear wheel to a position angularly disposed to the plane in which said rear wheel lies, a pivotal connecting means to pivotally connect said front wheels to respective ones of said first and second frame sub-assemblies at a point adjacent to said lower longitudinal frame member and in facing relationship with the sides of respective ones of said front wheels, a first upright frame member extending upwardly from said lower longitudinal frame member near one end thereof, a second upright frame member extending upwardly from said lower longitudinal frame member at a location spaced apart from said first upright frame member, and an upper longitudinal frame member extending between first and second upright frame members.

5. A vehicle as set forth in claim 4, including a seat mounted between said first and second frame sub-assemblies and connected to said upper longitudinal frame members of each of said first and second frame sub-assemblies, said seat being so mounted and connected in non-support relationship to said vehicle frame assembly, being mountable and removable without increasing or decreasing the stability and support of said frame assembly.

6. A vehicle as set forth in claim 4, wherein said front wheels and said rear wheels are of a sufficiently large diameter to enable the vehicle to travel over relatively rough, unpaved surfaces, said inturned portion of said lower longitudinal member permitting use of relatively large steerable front wheels, the axes of said front wheels being pivotally connected to respective ones of said first and second frame sub-assemblies at a point adjacent to said lower longitudinal members and in facing relationship with the sides of respective ones of said front wheels.

7. A vehicle as set forth in claim 6, wherein the said diameter of said wheels is in excess of eighteen inches.

8. A vehicle as set forth in claim 6, wherein the said diameter of said wheels is in excess of nine inches.

9. A vehicle as set forth in claim 2, wherein said front wheels and said rear wheels are of substantially the same diameter.

10. A vehicle as set forth in claim 6, wherein said front wheels and said rear wheels are of substantially the same diameter.

11. A vehicle powered by an electrical source, including a frame assembly which may be manually assembled and disassembled, a first frame sub-assembly, a second frame sub-assembly manually connectable to and manually disconnectable from said first frame sub-assembly, a plurality of wheels for said vehicle, at least one of said wheels being part of said first frame sub-assembly and at least one of said wheels being part of said second frame sub-assembly, wherein said first frame sub-assembly includes a front wheel and a rear wheel for one side of said vehicle, a said second frame sub-assembly includes a front wheel and a rear wheel for the opposite side of said vehicle, lateral connecting members between said first and second sub-assemblies, wherein said first and second frame sub-assemblies each includes a lower longitudinal frame member extending between the extended axes of said front wheel and said rear wheel, a first upright frame member extending upwardly from said lower longitudinal frame member near one end thereof, a second upright frame member extending upwardly from said lower longitudinal frame member at a location spaced apart from said first upright frame member, and an upper longitudinal frame member extending between first and second upright frame members, including auxiliary support members, said auxiliary support members comprising a first and second laterally extending plate member, said first plate member including a depending flange, first and second slot means in said depending flange at spaced apart locations thereon to receive the respective adjacent portions of said lower longitudinal frame members in said slot means, said first and second frame sub-assemblies being receivable in respective ones of said first and second slot means, locking means to lock said portions of said lower longitudinal frame members in said slot means; said second plate member including third and fourth slot means, said second plate member being mounted on said vehicle at a spaced apart location from said first plate member, said first upright frame members of said first and second frame sub-assemblies being received in respective ones of said third and fourth slot means, said first slot means opening along the bottom edge of said depending flange, said second slot means opening along a side edge of said depending flange, whereby said first plate member may be held more securely against movement relative to said lower longitudinal frame members when locked thereon.

12. A vehicle as set forth in claim 11, wherein said auxiliary support members include a resistance bank housing, said housing being pivotally and non-detachably mounted at one end of said first and second frame sub-assemblies, said housing including fastening means at said other end to fasten to the other of said frame sub-assemblies when said housing is pivoted outwardly from the frame sub-assembly to which it is pivotally mounted during assembly of said vehicle frame assembly, said resistance bank housing thereby providing increased stability and support for said vehicle frame assembly as well as a housing for electrical resistance members for connection to an electrical power circuit to drive said vehicle.

* * * * *